United States Patent

Camarena et al.

[11] Patent Number: 5,235,885
[45] Date of Patent: Aug. 17, 1993

[54] FOOD SLICING WITH CONTINUOUS CLEANING OF ENDLESS BAND SLICING BLADES

[75] Inventors: Jose L. Camarena, Rohnert Park; Robert J. Thomas, Millbrae, both of Calif.

[73] Assignee: Kraft General Foods, Inc., Northfield, Ill.

[21] Appl. No.: 780,999

[22] Filed: Oct. 23, 1991

[51] Int. Cl.⁵ .............................................. B23D 55/00
[52] U.S. Cl. ................................ 83/146; 83/168; 83/425.4; 83/700; 83/807; 83/808; 384/42
[58] Field of Search ................ 83/13, 23, 111, 145, 83/146, 168, 169, 807, 808, 820, 425.4, 700; 384/42

[56] References Cited

U.S. PATENT DOCUMENTS

| | | | |
|---|---|---|---|
| 1,494,774 | 5/1924 | Davis | 83/168 |
| 1,665,888 | 4/1928 | Litty | 83/168 |
| 1,751,891 | 3/1930 | Sivertsen | 83/168 X |
| 1,778,007 | 10/1930 | Criner | 83/751 |
| 1,861,412 | 5/1932 | Oliver | 83/168 X |
| 1,870,774 | 8/1932 | Gaines | 83/168 |
| 1,872,656 | 8/1932 | Bleam | 83/168 |
| 1,908,727 | 5/1933 | Bleam | 83/168 |
| 2,023,360 | 12/1935 | Taylor | 83/751 |
| 2,187,801 | 1/1940 | Brustowsky | 83/121 |
| 2,311,761 | 2/1943 | Kottmann et al. | 83/168 |
| 2,319,140 | 5/1943 | Kottmann et al. | 83/168 |
| 2,375,231 | 5/1945 | Kottmann | 83/168 |
| 2,423,363 | 7/1947 | Biro | 83/168 |
| 2,430,160 | 11/1947 | Criner | 83/751 |
| 2,492,824 | 12/1949 | Ahrndt et al. | 83/815 |
| 2,525,004 | 10/1950 | Spang | 83/168 X |
| 2,572,938 | 10/1951 | Lasar | 83/168 |
| 2,585,957 | 2/1952 | Meeker et al. | 83/168 |
| 2,606,578 | 8/1952 | Irwin et al. | 83/168 |
| 2,621,693 | 12/1952 | Grills | 83/168 X |
| 2,702,568 | 2/1955 | Irwin et al. | 83/168 |
| 2,741,281 | 4/1956 | Braun | 83/168 |
| 2,807,294 | 9/1957 | Brown | 83/168 |
| 2,884,029 | 4/1959 | Bruch | 83/168 |
| 2,964,076 | 12/1960 | Debs | 83/168 |
| 2,978,001 | 4/1961 | Whisler | 83/168 |
| 3,034,387 | 5/1962 | Sebastian | 83/168 |
| 3,208,487 | 9/1965 | Aja | 83/168 |
| 3,295,400 | 1/1967 | Anderson | 83/661 |
| 4,312,253 | 1/1982 | Johnson et al. | 83/167 |
| 4,318,323 | 3/1982 | Voorhees et al. | 83/168 |
| 4,515,051 | 5/1985 | Phillips | 83/146 |
| 4,576,074 | 3/1986 | Van der Togt | 83/358 |
| 4,606,251 | 8/1986 | Boileau | 83/168 |
| 4,686,875 | 8/1987 | Rijkaart | 83/425.2 |
| 4,727,652 | 3/1988 | Malet et al. | 30/383 |
| 5,031,497 | 7/1991 | Moshier et al. | 83/168 |
| 5,109,744 | 5/1992 | Syré et al. | 83/168 X |

*Primary Examiner*—Frank T. Yost
*Assistant Examiner*—Raymond D. Woods
*Attorney, Agent, or Firm*—Thomas R. Savoie

[57] ABSTRACT

An apparatus and method for slicing food products such as loaves of bread and the like where multiple slices are formed at substantially the same time. A blade cleaning assembly is included for removing slicing debris from band slicing blades after having moved through the product being sliced. Multiple blade continuous cleaning by opposed scraper blades through which each band blade passes achieve the desired cleaning function. The apparatus and method are particularly well-suited for removing slicing debris from loaves of bread which are of the so-called no-fat or low-fat variety.

14 Claims, 2 Drawing Sheets

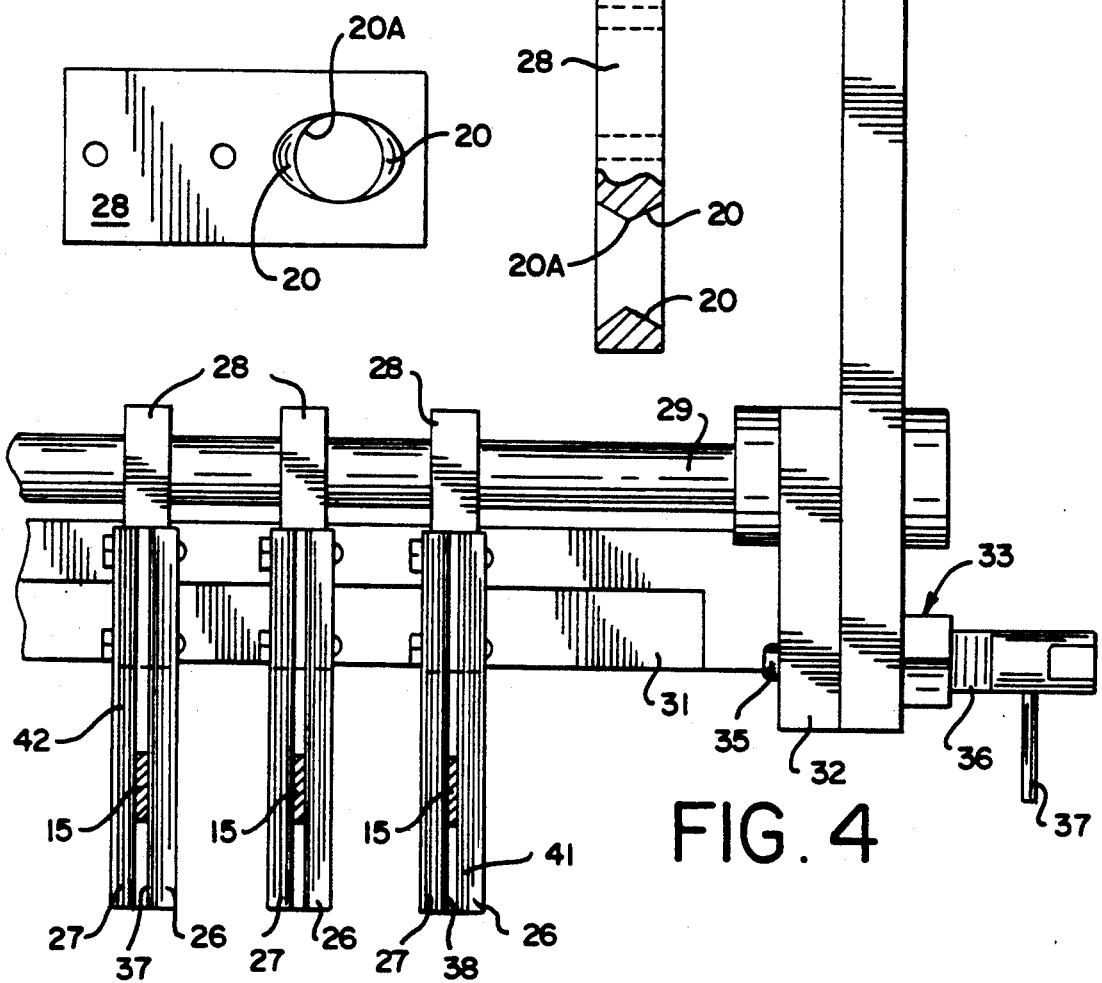
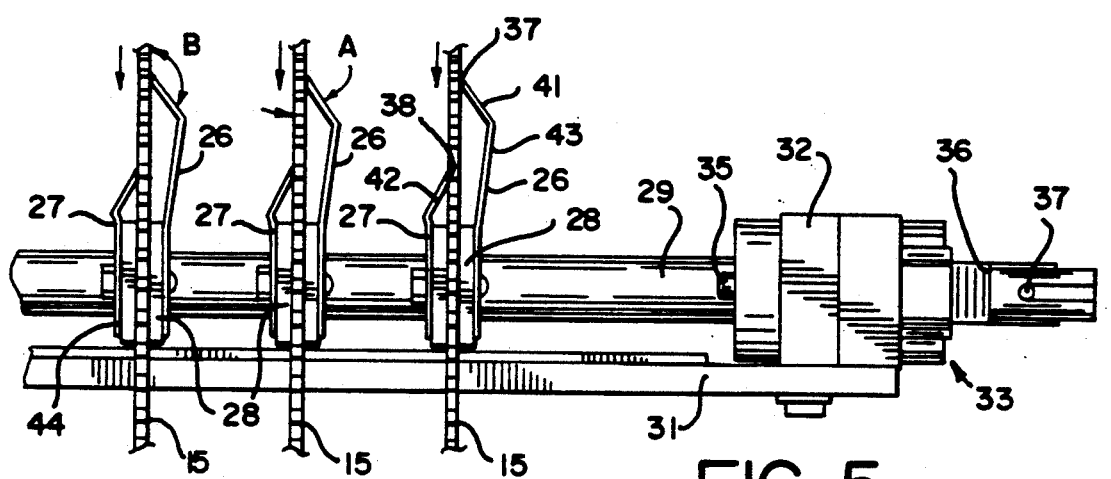

FOOD SLICING WITH CONTINUOUS CLEANING OF ENDLESS BAND SLICING BLADES

BACKGROUND AND DESCRIPTION OF THE INVENTION

The present invention generally relates to the slicing of food products with a plurality of endless band slicing blades which are continuously cleaned during slicing movement of the blades. More particularly, the invention relates to a cleaning system having multiple scraper blade assemblies, each of which engages one of a plurality of generally laterally spaced endless band slicing blades. The cleaning system removes slicing debris and the like from each endless band slicing blade when it passes through individual generally opposing scraper pairs positioned for engaging generally opposing surfaces of each endless band slicing blade. By virtue of the invention, loaves of bread and the like are sliced with slicing blades that are continuously cleaned of debris such as glutenous deposits and the like which tend to form on these types of slicing blades. The invention is especially well-suited for slicing loaves of bread that are of the so-called low-fat or no-fat variety.

Food materials, such as loaves of bread and the like for many years have been sliced at commercial bakeries and packaged on an industrial scale in order to provide consumers with pre-sliced packaged bread. Industrial scale bread-slicing machines have long been used in this regard. Many of these machines incorporate a plurality of generally laterally spaced endless band slicing blades into which unsliced loaves of bread and the like are fed for transforming the loaf or the like into a plurality of slices of a selected thickness. Exemplary in this regard are machines of the type described in U.S. Pat. Nos. 2,311,761, 2,319,140 and 2,375,231, the subject matter thereof being incorporated by reference hereinto.

Heretofore, it has been appreciated that debris from the bread loaves or the like being sliced has a tendency to build up upon the endless band slicing blades in these types of machines. Approaches which have been taken in the past in an effort to alleviate this concern have included the use of air jets to dislodge crumbs and the like from locations within the machine. Other approaches rely heavily upon wiping the endless band slicing blades with a food-grade lubricant with the objective of lessening adhesion between the blades and glutenous material of the bread or the like being sliced. At times, this lubricating approach is assisted by providing an elongated scraper that simultaneously engages all of the endless band slicing blades, typically at a location at which the blades are supported by another portion of the machine. It has been found that these types of approaches are less than fully satisfactory for avoiding the buildup of debris such as glutenous material on these endless band slicing blades when the products being sliced are breads of the so-called no-fat or low-fat variety or breads which contain relatively large particles of food items, such as raisins, onion bits and the like which tend to hang up on the slicing blades.

Efforts to address the difficult problems associated with these types of food products such as no-fat or low-fat breads have included utilizing hot water and/or steam sprays directed onto the endless band slicing blades. Approaches of this type bring with them many other problems, most notably requirements for time-consuming cleanup operations as well as significant deterioration of the slicing equipment due to excessive exposure to steam and/or hot water which tends to damage machinery of this type. Another basic approach which has been suggested for handling these types of food products which are extremely low in fat content is to redesign certain characteristics of these types of endless band slicers by modifying certain aspects of the equipment, such as blade speed, loaf infeed speeds, and/or specific features of the drums or pulleys between which the band slicing blades are mounted. Besides requiring virtually new capital equipment, this approach has the potential disadvantage of requiring slower production rates caused by reduced infeed speeds and the like. Generally speaking, these types of more radical approaches are believed to be necessitated because low-fat or no-fat products are missing a natural release agent, the fat, which tends to automatically loosen material buildup, which in a sense provides a self-cleaning situation. Without this fat as a component of the bread itself, the glutenous material and the like tends to stick even more tenaciously to the endless band slicing blades.

Accordingly, there is a need for an arrangement whereby commercial-scale bakeries or like food processing plants can slice loaves of bread and the like having very low or virtually no fat content without encountering buildup of glutenous material or the like on the slicing blades. Especially advantageous in this regard would be the ability to achieve this result by a retrofit arrangement which would avoid the need for large capital investment or for cleaning arrangements which themselves create a significant cleanup and/or maintenance task. It is also desirable that an approach be found which does not require a slowing of through-put speeds through the slicing apparatus.

In summary, the present invention achieves food slicing with continuous cleaning of endless band slicing blades by incorporating a blade cleaning assembly which engages and cleans slicing debris from a plurality of endless band blades which are generally laterally spaced from each other. The blade cleaning assembly incorporates a plurality of individual scraper blade pairs which frictionally engage and remove slicing debris from generally opposing surfaces of each blade in such a manner that both surfaces of each endless band slicing blade are scraped by the scraper blade pair. Advantageously, the scraper assembly is readily moved to fully clear the endless band slicing blades in order to accommodate replacement or adjustment of the endless band slicing blades or other maintenance or repair tasks when needed.

It is accordingly a general object of the present invention to provide an improved food slicing apparatus and method for continuously cleaning endless band slicing blades while they are in operation.

Another object of this invention is to provide an improved food slicing apparatus and method which are particularly suitable for slicing low-fat or no-fat loaves of bread.

Another object of the present invention is to provide an improved food slicing apparatus and method including a band blade cleaning function which is accomplished in a retrofitted manner and without requiring substantial expenditures of capital.

Another object of the present invention is to provide an improved slicing apparatus and method which automatically cleans debris such as glutenous material from endless band slicing blades without requiring the use of corrosive materials which lead to maintenance or cleanup problems.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 3 is an enlarged elevational view of a mounting block of the preferred continuous cleaning assembly;

FIG. 3A is a top plan view, partially broken away, of the mounting block shown in FIG. 3;

FIG. 4 is a top plan view of the preferred continuous cleaning assembly; and

FIG. 5 is an elevational view, generally of the front portion of the continuous cleaning assembly shown in FIG. 2 through FIG. 4.

DESCRIPTION OF THE PARTICULAR EMBODIMENTS

Figure 1:
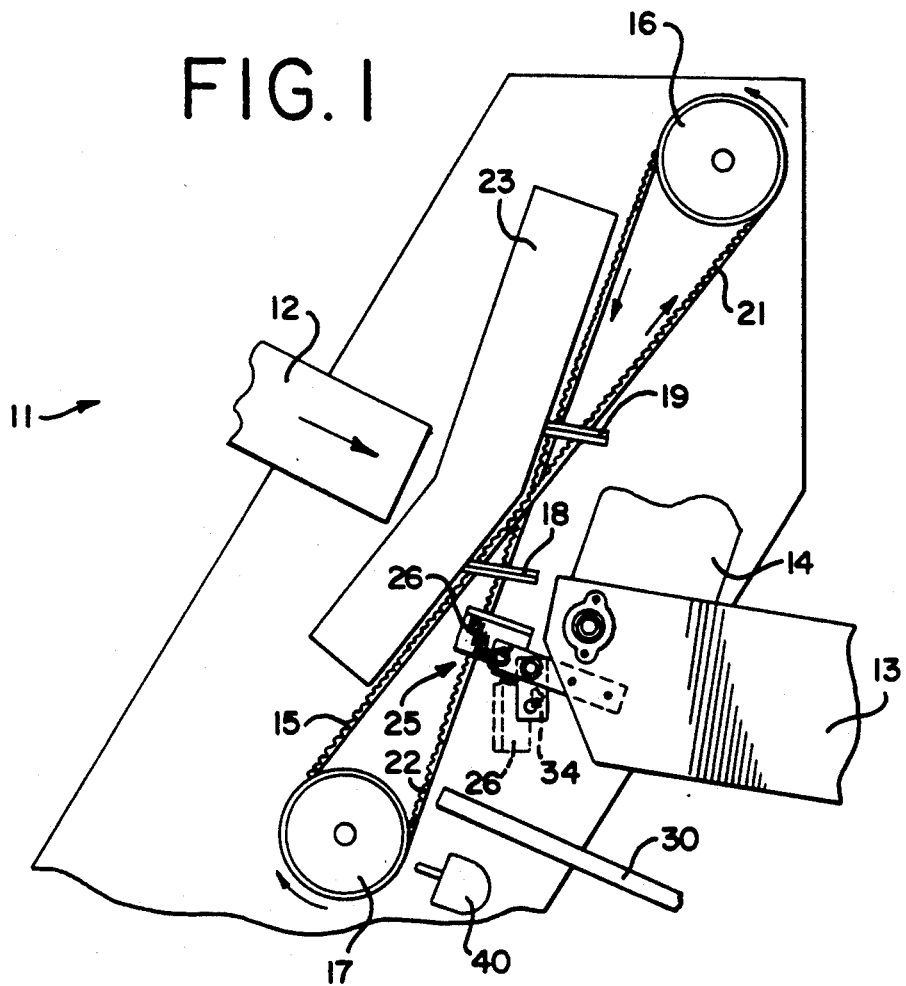
FIG. 1 is an elevation view illustrating food slicing with endless band slicing blades having a continuous cleaning assembly in accordance with this invention.
Figure 2:
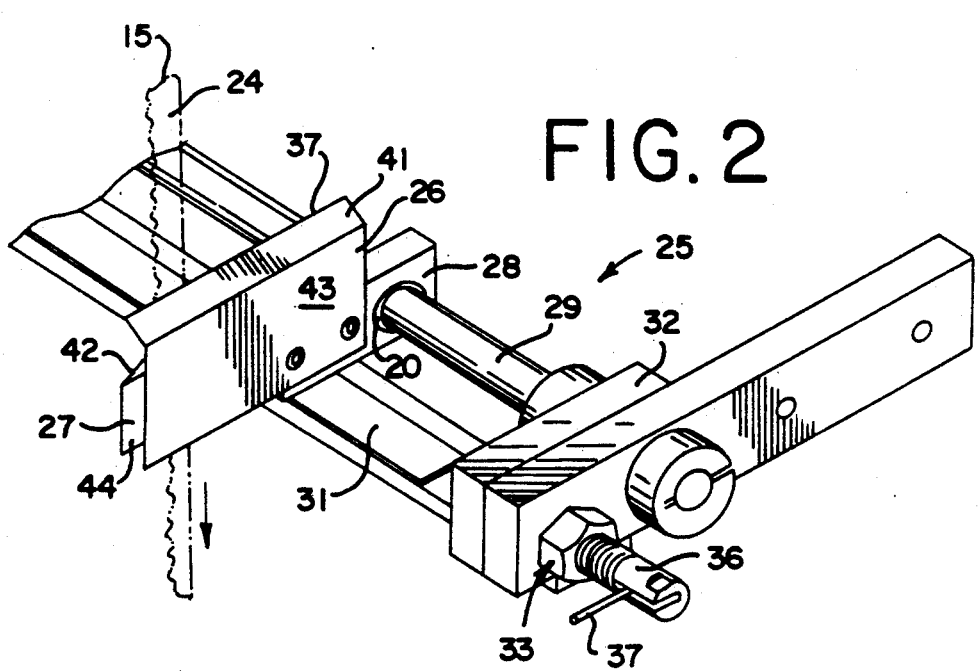
FIG. 2 is a perspective view, partially broken away, of a preferred embodiment of the continuous cleaning assembly according to the invention.

A food slicing apparatus, generally designated as 11, of a typical construction as used in commercial bakeries and the like is illustrated in FIG. 1. The illustrated food slicing apparatus 11 is one in which a food product, such as a loaf of bread is severed into a plurality of slices, after which the sliced food product is packaged for distribution to consumers. Food slicing apparatus 11 includes an infeed conveyor assembly 12 and a discharge conveyor assembly 13. In the preferred embodiment which is illustrated in the drawings, the food slicing apparatus is one that is particularly adapted for slicing a continuous stream of loaves of bread, a sliced loaf being designated by reference numeral 14.

In the preferred food slicing apparatus 11 shown in FIG. 1, the slicing is accomplished by a plurality of endless band slicing blades 15, each of which is mounted between an upper pulley drum 16 and a lower pulley drum 17. Each endless band slicing blade 15 is mounted in a crossed manner in accordance with arrangement well known in the art. As so arranged, the slicing blades 15 provide a slicing zone, which is generally defined between a bottom blade guide assembly 18 and a top blade guide assembly 19. Blades 15 also pass through a lower blade return zone, which is generally defined between the bottom blade guide assembly 18 and the lower pulley drum 17, as well as through an upper blade return zone, which is generally defined between the top blade guide assembly 19 and the upper pulley drum 16. Each blade 15 thus has, at any given moment, an upwardly running section 21 and a downwardly running section 22.

Blades 15 are arranged in a side-by-side orientation. In a typical food slicing apparatus 11, the side-by-side spacing between the blades 15 is adjustable in order to vary the thickness of the slices made by the apparatus. For example, with a bread slicing apparatus, the blades could be adjusted so as to provide a slice thickness of about seven-sixteenths of an inch, or slices thinner or thicker than that, as desired. A usual mechanism for effecting such adjustment is an accordion-like adjustment assembly 23 which operates in a known manner in order to vary the spacing between flat sides 24 of adjacent blades 15.

As generally illustrated in FIG. 1, when a food loaf or the like is fed from the infeed conveyor assembly 12 and into the slicing zone, it generally initially engages the upwardly running sections 21 of the blades 15, which initiates the complete slicing action, the complete slicing action also including the movement of the food loaf or the like through the downwardly running sections 22 of the slicing blades 15. This is accomplished in a manner which is generally known in the art. A blade cleaning assembly, generally designated as 25, is positioned whereby it individually cleans the blades 15 after the downwardly running section 22 has passed through the loaf and before the upwardly running section 21 initially engages the loaf for slicing same. In this manner, a cleaned blade initially engages and begins to slice the food loaf or the like.

With more particular reference to the blade cleaning assembly 25, in the preferred embodiment, it is mounted within the lower blade return area as generally illustrated in FIG. 1. In the illustrated embodiment, the blade cleaning assembly 25 is conveniently mounted to the discharge conveyor assembly 13, although mounting to any convenient, secure location is acceptable, depending upon the particular food slicing apparatus 11. Blade cleaning assembly 25 has a plurality of scraper blade assemblies mounted along a guide assembly in a manner such that an individual scraper blade assembly is provided for each endless band slicing blade 15, and the location of each scraper blade assembly is automatically adjusted along the guide assembly in order to conform with the location of the endless band slicing blade passing through each scraper blade assembly.

In the illustrated embodiment, the scraper blade assembly takes the form of generally opposing scraper blades 26 and 27 secured to a slidable mounting block 28 in a manner such that each endless band slicing blade 15 passes between an individual pair of scraper blades 26 and 27 when the blade cleaning assembly 25 is in its blade cleaning position as illustrated in the drawings. This engagement is discontinued when desired, at which time the scraper blades 26, 27 drop away from the endless band slicing blades 15 as generally illustrated in phantom in FIG. 1.

The guide assembly illustrated in the drawings mounts the slidable mounting blocks 28 along an axis which is generally transverse to the respective generally parallel planes of operation of the endless band slicing blades 15. Rigid shaft 29 performs this function. Preferably, the area of contact between the slidable mounting blocks 28 and the rigid shaft 29 is one having low friction properties. For example, the slidable mounting blocks 28 may be constructed of Delryn polymer or other similar relatively low friction material, while the rigid shaft 29 can be made of a smooth metal, such as a polished steel or the like. With this type of arrangement, each slidably mounted block 28 and hence each scraper blade pair 26, 27 automatically moves along the axis of the rigid shaft 29 in response to variations in the spacing between the endless band slicing blades 15. These variations in spacing will accommodate changes made, for example by manipulating the accordion-like adjustment assembly 23, in order to vary the thickness of the slices made by the food slicing apparatus 11. This arrangement also accommodates generally instantaneous changes in positioning of each individual endless band slicing blade 15 during operation of the food slicing apparatus 11 due, for example, to slight twisting of the endless band slicing blades during operation of the food slicing apparatus 11. In other words, the individual scraper blade pairs 26, 27 generally float with the endless band slicing blades in order to conform to the spacing and angle of each individual endless band slicing blade 15. The guide assembly is thus a guiding mechanism which allows the scraper blade pairs 26, 27 to generally free-float in a controlled or guided manner.

The ability of the blade pairs 26, 27 to generally float with the endless band slicing blades is facilitated in the preferred embodiment by providing a lateral double bevel surface 20 along the mounting opening of each slidable mounting block 28, which is perhaps best illustrated in FIG. 3 and FIG. 3A. Surface 20 has a beveled portion of both the inside face and the outside face of each slidable mounting block 28 such that the mounting opening thereof is defined by two laterally beveled portions joined at a circular edge 20A. As can be seen in the drawings, especially FIG. 3, the laterally beveled portions 20 extend only along the front and rear sides of the mounting opening, and the topmost and bottommost sides of the mounting opening are not beveled to any significant degree. This structure of the mounting openings accommodates movement of the slidable mounting blocks 28 in a general side-to-side fashion, while movement in a general up-and-down fashion is not so accommodated. As an example of the extent of the beveled portions 20, for a circular edge 20A with a one-half inch diameter, a three-thirtyseconds inch lateral bevel to center only is especially preferred.

Also included is a support assembly for maintaining the scraper blade pairs 26, 27 in engagement with the respective give endless band slicing blades 15 when it is desired that the blade cleaning assembly 25 be in its cleaning mode. The illustrated support assembly includes an elongated support bar 31 upon which the slidably mounted block 28 rests during the cleaning mode. Rotatable end blocks 32 secure the elongated support bar 31 along each of its ends. Rotatable end blocks 32 are mounted along the axis of the rigid shaft 29, with the result that the elongated support bar 31 is rotatably mounted along the rigid shaft 29.

A locking pin assembly 33 is included to secure the rotatable end blocks 32 and the elongated support bar 31 in their blade cleaning orientation. More particularly, a hole 34 (FIG. 1) is included within rotatable block 32, and an engagement pin 35 (FIG. 4 and FIG. 5) passes therethrough when the locking pin assembly 33 is in its locked position as shown in FIG. 4 and FIG. 5. Preferably, the locking pin assembly 33 is biased in this locking or extended position. Unlocking is achieved by a suitable key and slot arrangement or the like (not shown) within the locking pin assembly 33 whereby rotation of operation handle 36 by, for example grasping lever 37, will permit the engagement pin 35 to slide out of the hole 34 and clear same, at which time the rotatable end blocks 32 and hence the scraper blade pairs 26, 27, are free to drop out of engagement with the endless band slicing blades 15. Because of the close fitting engagement between the endless band slicing blades and the scraper blade pairs 26, 27, actual disengagement therebetween typically will require a short-term movement, or "jog," of the endless band slicing blades 15 by turning on and rapidly turning off the food slicing apparatus 11. When this happens, the blade cleaning assembly 25 automatically drops away from and clears the endless band slicing blades 15. This feature facilitates the ability to replace, sharpen or otherwise handle the endless band slicing blades 15. It will be noted that the blade cleaning assembly 25 thereby fully clears the endless band slicing blades 15.

By positioning the blade cleaning assembly 25 within the lower blade return zone, the slicing debris which is removed from the endless band slicing blades 15 by the scraper blade pairs 26, 27 falls harmlessly out of the way of the operating mechanism of the food slicing apparatus 11, for example into a catch pan 30 below the blade cleaning assembly 25.

It is preferred to position a spray assembly 40 to direct a spray of food-grade lubricating or release oil composition toward the blades 15 in order to assist the debris removal function by providing a film of the lubricating composition on the surface of the blades 15 shortly before blades 15 engage the food product to slice same. It has been found that an advantageous location for the spray assembly 40 is within the lower blade return zone, preferably below the catch pan 30. Exemplary lubricating compositions include food grade mineral oil (for example, 200 grade oil) and Myvocet 9-45 (trademark of Eastman Kodak) which is a distilled acrylated monodiglyceride. Spray assembly 40 should be arranged so as to provide a thin film without distributing the lubricating composition onto other locations of the slicing equipment. Arrangements along these lines include having an accurately directed spray and controlling the timing of the spraying to avoid excessive delivery of lubricating composition. The combination of a spray assembly 40 together with the cleaning assembly 25 as described has been found to achieve especially advantageous blade cleaning results.

The preferred scraper blades 26, 27 are constructed of spring steel that has been annealed, hardened and ground to provide a scraping edge 37, 38 which is harder than the endless band slicing blades 15. Preferred heat treatment is to about Rockwell 50. These scraper blade pairs 26, 27 can withstand daily operation for six months without having to be replaced or sharpened.

Referring more specifically to the shape of the preferred scraper blades 26, 27, each has an end portion 41, 42 and a body portion 43, 44. Each end portion 41, 42 is bent at an acute angle in a direction which is generally inwardly toward a respective flat side 24 of each blade 15, as perhaps best seen in FIG. 5. In this way, the scraping edge 37, 38 at the tip of the end portion 41, 42 engages the blade flat side 24 at an acute angle A defined by each end portion 41, 42 and the flat side 24 which is under the end portion 41, 42 at any given moment. Each endless band slicing blade 15 moves in a direction into the area under the pair of scraper blades 26, 27, whereby each flat side 24 of each blade 15 is scraped at an obtuse scraping angle B. Preferably, the scraping edges 37, 38 are offset from each other as illustrated in FIG. 5 such that one scraping edge 37 scrapingly engages one flat side 24 before the other scraping edge 38 scrapingly engages the other flat side 24.

It is especially preferred that each scraping edge 37, 38 have a generally chisel-edged shape, as generally shown in FIG. 5. The chisel-edged shape is such that each scraping edge 37, 38 is substantially parallel to the side surface of the blade 15 which it engages. This ensures the debris is taken over the top of the edge 37, 38 and will not clog. Preferably, the chisel-edged shape is formed after heat treating of the scraper blades 26, 27.

One might expect that an arrangement such as that provided by the present invention would cause undue wear in view of the continuous and constant frictional engagement between the multiple scraper blade pairs and the endless band slicing blades. One might expect that this frictional engagement would cause heat buildup and excessive wear of the endless band slicing blades. However, it has been determined that the apparatus as described herein results in running temperatures which are cooler than those without the blade cleaning assembly 25 when slicing low-fat or no-fat breads. It is believed that this cooler running operation is experienced at least in part because the endless band slicing blades are constantly cleaned of buildup debris from these types of breads. It has been determined that there is an improvement in reducing wear and breakage of the endless band slicing blades. Reducing the wear will also extend blade life because such reduces the incidence of having to hone the endless band slicing blades, which can reduce blade life caused at least in part by inconsistent honing procedures.

It will thus be seen that the present invention provides new and useful slicing arrangements having advantageous properties and characteristics, including those pointed out herein and others which are inherent in the invention. Preferred embodiments of the invention have been described by way of example, and it is anticipated that modifications may be made to those described herein without departing from the spirit of the invention or the scope of the appended claims.

We claim:

1. An apparatus for slicing food loaves on a continuous basis, comprising:

means for supporting and feeding a flow of a plurality of food loaves to and into a slicing assembly;

said slicing assembly having a plurality of endless band slicing blades which rotate through respective generally parallel blade pathways and into slicing engagement with each food loaf, said endless band slicing blades passing through a slicing zone of each blade pathway, the slicing zone being in general alignment with said supporting and feeding means, said endless band slicing blades also passing through a blade return zone at which no slicing takes place, the blade return zone also being within each blade pathway;

means for receiving and supporting each food loaf after having passed through said slicing zone and slicing assembly in order to provide a sliced food loaf;

blade cleaning means for engaging and cleaning slicing debris from each individual one of said plurality of endless band slicing blades within said blade return zone, said blade cleaning means including a guide assembly having a plurality of individual scraper blade means, each scraper blade means being for engaging one of the endless band slicing blades to frictionally remove slicing debris from the endless band slicing blades while said endless band slicing blades move through and are within the blade return zone, each said scraper blade means includes a pair of generally opposed scraper members between which one of said endless band slicing blades passes, one scraper member of each said pair of scraper members engages one side surface of the endless band slicing blade, and the other scraper member engages a generally opposing side surface of the endless band slicing blade; and means for mounting each generally opposed scraper member pair, said mounting means permitting movement of each generally opposed scraper member pair in response to lateral movement of the endless band slicing blades in a direction closer to or farther from each other, said mounting means including a mounting block secured to each generally opposed scraper member pair, each mounting block being slidably mounted onto a rigid shaft generally transverse to the blade pathways, and wherein said mounting block is mounted onto said rigid shaft by way of a mounting opening through said mounting block, said mounting opening having a lateral double beveled surface.

2. The slicing apparatus in accordance with claim 1, wherein said plurality of individual scraper blade means substantially simultaneously engage and clean each of said endless band slicing blades.

3. The slicing apparatus in accordance with claim 1, wherein each generally opposed scraper member has an end portion which engages the endless band slicing blade at an acute angle whereby the endless band slicing blades engages a free edge of the end portion of each scraper blade when the blade moves into the acute angle, the acute angle being defined by the end portion and the endless band slicing blade thereunder.

4. The slicing apparatus in accordance with claim 3, wherein each end portion of the scraper members has a generally chisel-edged shaped surface which is generally parallel to each endless band slicing blade.

5. The slicing apparatus in accordance with claim 3, wherein respective end portions of said scraper members of each pair thereof are offset from each other, whereby one of said end portions engages said band blade before the other end portion engages said band blade.

6. The slicing apparatus in accordance with claim 1, wherein said scraper members have blade engagement surfaces offset from one another, whereby, one of said scraper members engages said endless band slicing blade before the other scraper member engages said endless band slicing blade.

7. The slicing apparatus in accordance with claim 1, further including mounting means for the generally opposed scraper member pairs, including means for permitting pivoting movement of the generally opposed scraper member pairs away from and clear of the blade pathways of the endless band slicing blades.

8. The slicing apparatus in accordance with claim 7, wherein said pivoting movement means includes a support assembly that supports each generally opposed scraper member pair that includes a locking assembly for securing said support assembly into an orientation to support the generally opposed scraper member pairs and out of said supporting orientation when desired.

9. A blade cleaning assembly for an apparatus for slicing food products on a continuous basis, the food product slicing apparatus including means for supporting and feeding a continuous flow of a plurality of food products thereto, a plurality of band slicing blades for engaging and slicing a continuous flow of food products, and means for receiving and supporting each food product after having passed through the slicing blades to provide a continuous flow of sliced food products, wherein said blade cleaning assembly comprises:

a plurality of individual scraper blade means for cleaning one of each of the band slicing blades, each individual scraper blade means being mounted so as to be generally parallel to a slicing pathway through which each band slicing blade moves;

a pair of generally opposed scraper members included in each scraper blade means, each scraper member of each said generally opposed scraper member pairs has a scraping edge that engages a generally flat side surface of each band blade, one said scraper member engaging one side surface of each said band blade and the other said scraper member engaging a generally opposing side surface of each said band blade;

means for substantially simultaneously moving each of said generally opposed scraper member pairs out of engagement with its respective band slicing blade, when desired;

means for mounting each generally opposed scraper member pair, said mounting means permitting movement of each generally opposed scraper member pair in response to lateral movement of the endless band slicing blades in a direction closer to or farther from each other, wherein the mounting means includes a mounting block secured to each generally opposed scraper member pair, each mounting block being slidably mounted onto a rigid shaft generally transverse to the slicing pathway by way of a mounting opening through said mounting block, said mounting opening having a lateral double beveled surface.

10. The blade cleaning assembly in accordance with claim 9, wherein said means for simultaneously moving said scraper member pairs including mounting means for the generally opposed scraper member pairs, including means for permitting pivoting movement of the generally opposed scraper member pairs away from and clear of the slicing pathway of the endless band slicing blades.

11. The blade cleaning assembly in accordance with claim 9, wherein said moving means includes a support assembly that supports each generally opposed scraper member pair and that includes a locking assembly for securing said support assembly into an orientation to support the generally opposed scraper member pairs and out of said supporting orientation when desired.

12. The blade cleaning assembly in accordance with claim 9, wherein each generally opposed scraper member has an end portion which engages the endless band slicing blade at an acute angle whereby the endless band slicing blade engages a free edge of the end portion of each scraper blade when the blade moves into the acute angle, the acute angle being defined by the end portion and the endless band slicing blade thereunder.

13. The blade cleaning assembly in accordance with claim 12, wherein respective end portions of said scraper members of each pair thereof are offset from each other, whereby one of said end portions engages said band blade before the other end portion engages said band blade.

14. The blade cleaning assembly in accordance with claim 13, wherein each end portion of the scraper means has a generally chisel-edged shaped surface which is generally parallel to each endless band slicing blade.

* * * * *